(12) United States Patent
Fuhse et al.

(10) Patent No.: US 9,176,266 B2
(45) Date of Patent: Nov. 3, 2015

(54) SECURITY ELEMENT, VALUE DOCUMENT COMPRISING SUCH A SECURITY ELEMENT AND METHOD FOR PRODUCING SUCH A SECURITY ELEMENT

(75) Inventors: Christian Fuhse, Otterfing (DE); Manfred Heim, Bad Tölz (DE); Michael Rahm, Bad Tölz (DE); Andreas Rauch, Ohlstadt (DE); Stefan Bichlmeier, Unterhaching (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 13/513,301

(22) PCT Filed: Dec. 3, 2010

(86) PCT No.: PCT/EP2010/007369
§ 371 (c)(1),
(2), (4) Date: Jun. 28, 2012

(87) PCT Pub. No.: WO2011/066991
PCT Pub. Date: Jun. 9, 2011

(65) Prior Publication Data
US 2012/0319395 A1 Dec. 20, 2012

(30) Foreign Application Priority Data

Dec. 4, 2009 (DE) .......................... 10 2009 056 932
Oct. 4, 2010 (DE) .......................... 10 2010 047 250

(51) Int. Cl.
*B42D 25/328* (2014.01)
*B42D 25/324* (2014.01)
(Continued)

(52) U.S. Cl.
CPC .............. *G02B 5/1861* (2013.01); *B42D 25/29* (2014.10); *G02B 5/1842* (2013.01); *B42D 25/324* (2014.10); *B42D 25/328* (2014.10); *B42D 2033/24* (2013.01); *B42D 2035/20* (2013.01)

(58) Field of Classification Search
CPC ........... B42D 2033/24; B42D 2035/28; B42D 25/328; B42D 25/324
See application file for complete search history.

(56) References Cited

U.S. PATENT DOCUMENTS

| 4,012,843 A | 3/1977 | Harada et al. |
| 4,184,700 A | 1/1980 | Greenaway |

(Continued)

FOREIGN PATENT DOCUMENTS

| AU | 738289 B2 | 9/2001 |
| AU | 2003283372 A1 | 6/2004 |

(Continued)

OTHER PUBLICATIONS

International Search Report in PCT/EP2010/007369, dated Jun. 7, 2011 and English translation thereof.

(Continued)

*Primary Examiner* — Kyle Grabowski
(74) *Attorney, Agent, or Firm* — Workman Nydegger

(57) ABSTRACT

A security element for a security paper, value document or the like, having a carrier which has a reflective areal region which is divided into a multiplicity of reflective pixels. The area of each pixel is smaller than the area of the reflective areal region by at least one order of magnitude. Each pixel has at least one reflective facet which is formed in a surface of the carrier, and the at least one reflective facet reflects light incident along a predetermined direction on the areal region directionally in a reflection direction predefined by the orientation of the facet. The orientations of the facets of different pixels have a substantially random variation over the reflective areal region.

22 Claims, 7 Drawing Sheets

(51) Int. Cl.
*G02B 5/18* (2006.01)
*B42D 25/29* (2014.01)

(56) References Cited

U.S. PATENT DOCUMENTS

| | | | |
|---|---|---|---|
| 4,484,797 A | 11/1984 | Knop et al. | |
| 4,568,141 A | 2/1986 | Antes | |
| 4,838,648 A | 6/1989 | Phillips et al. | |
| 4,892,385 A | 1/1990 | Webster, Jr. et al. | |
| 4,984,824 A | 1/1991 | Antes et al. | |
| 5,032,003 A | 7/1991 | Antes | |
| 5,101,184 A * | 3/1992 | Antes | 235/454 |
| 5,105,306 A | 4/1992 | Ohala | |
| 5,106,125 A | 4/1992 | Antes | |
| 5,301,062 A | 4/1994 | Takahashi et al. | |
| 5,335,113 A | 8/1994 | Jackson et al. | |
| 5,428,479 A | 6/1995 | Lee | |
| 5,770,120 A | 6/1998 | Kamihara et al. | |
| 5,825,547 A | 10/1998 | Lee | |
| 5,909,313 A | 6/1999 | Lee | |
| 6,088,161 A | 7/2000 | Lee | |
| 6,157,487 A * | 12/2000 | Staub et al. | 359/567 |
| 6,226,127 B1 | 5/2001 | Dunn et al. | |
| 6,342,969 B1 | 1/2002 | Lee | |
| 6,870,678 B2 | 3/2005 | Tompkin et al. | |
| 6,975,438 B2 * | 12/2005 | Schilling et al. | 359/2 |
| 6,987,590 B2 | 1/2006 | Phillips et al. | |
| 7,106,516 B2 | 9/2006 | Lotz et al. | |
| 7,281,810 B2 | 10/2007 | Lee | |
| 7,517,578 B2 * | 4/2009 | Raksha et al. | 428/195.1 |
| 7,630,954 B2 * | 12/2009 | Adamczyk et al. | 283/72 |
| 7,699,350 B2 | 4/2010 | Heim | |
| 7,719,733 B2 | 5/2010 | Schilling et al. | |
| 8,149,511 B2 | 4/2012 | Kaule et al. | |
| 8,187,771 B2 | 5/2012 | Staub et al. | |
| 8,400,495 B2 | 3/2013 | Kaule | |
| 8,632,100 B2 | 1/2014 | Kaule et al. | |
| 2001/0041307 A1 | 11/2001 | Lee et al. | |
| 2004/0032659 A1 | 2/2004 | Drinkwater | |
| 2004/0057113 A1 | 3/2004 | Tompkin | |
| 2005/0068624 A1 | 3/2005 | Schilling et al. | |
| 2005/0127663 A1 | 6/2005 | Heim | |
| 2005/0179254 A1 | 8/2005 | Heim et al. | |
| 2005/0270604 A1 | 12/2005 | Drinkwater | |
| 2007/0183045 A1 | 8/2007 | Schilling et al. | |
| 2007/0246933 A1 | 10/2007 | Heim et al. | |
| 2007/0291362 A1 | 12/2007 | Hill et al. | |
| 2008/0160226 A1 | 7/2008 | Kaule et al. | |
| 2008/0231976 A1 | 9/2008 | Commander et al. | |
| 2008/0250954 A1 | 10/2008 | Depta et al. | |
| 2008/0258456 A1 * | 10/2008 | Rahm et al. | 283/85 |
| 2008/0259456 A1 | 10/2008 | Schilling et al. | |
| 2009/0008923 A1 | 1/2009 | Kaule et al. | |
| 2009/0091834 A1 | 4/2009 | Ryzi et al. | |
| 2009/0162756 A1 | 6/2009 | Staub et al. | |
| 2010/0001508 A1 | 1/2010 | Tompkin et al. | |
| 2010/0045024 A1 * | 2/2010 | Attner et al. | 283/72 |
| 2010/0177094 A1 | 7/2010 | Kaule et al. | |
| 2010/0182221 A1 | 7/2010 | Kaule et al. | |
| 2010/0194532 A1 | 8/2010 | Kaule | |
| 2010/0208036 A1 | 8/2010 | Kaule | |
| 2010/0254007 A1 | 10/2010 | Toda | |
| 2011/0012337 A1 | 1/2011 | Heim | |

FOREIGN PATENT DOCUMENTS

| | | |
|---|---|---|
| CN | 1193299 A | 9/1998 |
| CN | 100534807 C | 9/2009 |
| CN | 100567022 C | 12/2009 |
| CN | 101610907 A | 12/2009 |
| DE | 25 55 214 A1 | 6/1977 |
| DE | 195 06 880 A1 | 8/1996 |
| DE | 10 129 939 A1 | 1/2003 |
| DE | 10 2004 017 094 A1 | 11/2005 |
| DE | 10 2005 025 095 A1 | 12/2006 |
| DE | 10 2005 027 380 A1 | 12/2006 |
| DE | 10 2005 061 749 A1 | 7/2007 |
| DE | 10 2006 016 139 A1 | 10/2007 |
| DE | 10 2008 013 167 A1 | 9/2009 |
| DE | 10 2008 046 128 A1 | 3/2010 |
| EP | 0 105 099 A1 | 4/1984 |
| EP | 0 227 423 A2 | 7/1987 |
| EP | 0 330 738 A1 | 9/1989 |
| EP | 0 375 833 A1 | 7/1990 |
| EP | 0 429 782 A1 | 6/1991 |
| EP | 1 547 807 A2 | 6/2005 |
| EP | 1 580 020 A1 | 9/2005 |
| EP | 1 658 992 A1 | 5/2006 |
| JP | S57-208514 A | 12/1982 |
| JP | S59-12403 A | 1/1984 |
| JP | S60-8802 A | 1/1985 |
| JP | 2008-80609 A | 4/2008 |
| WO | 90/07133 A1 | 6/1990 |
| WO | 90/08338 A1 | 7/1990 |
| WO | 91/03747 A1 | 3/1991 |
| WO | 93/18419 A1 | 9/1993 |
| WO | 94/28444 A1 | 12/1994 |
| WO | 97/16772 A1 | 5/1997 |
| WO | 97/19821 A1 | 6/1997 |
| WO | 97/34170 A2 | 9/1997 |
| WO | 98/20382 A1 | 5/1998 |
| WO | 98/23979 A1 | 6/1998 |
| WO | 98/53999 A1 | 12/1998 |
| WO | 99/65699 A1 | 12/1999 |
| WO | 00/13916 A1 | 3/2000 |
| WO | 01/80175 A1 | 10/2001 |
| WO | 02/06858 A2 | 1/2002 |
| WO | 02/091041 A1 | 11/2002 |
| WO | 03/068525 A1 | 8/2003 |
| WO | 2005/042268 A1 | 5/2005 |
| WO | 2006/013215 A1 | 2/2006 |
| WO | 2006/087138 A1 | 8/2006 |
| WO | 2006/125224 A2 | 11/2006 |
| WO | 2007076952 A2 | 7/2007 |
| WO | 2009/000527 A1 | 12/2008 |
| WO | 2009/000528 A1 | 12/2008 |
| WO | 2009/128168 A1 | 10/2009 |
| WO | WO2012/123303 * | 9/2012 |

OTHER PUBLICATIONS

International Preliminary Report on Patentability in PCT/EP2010/007369, dated Jun. 5, 2012.
German Search Report in10 2009 056 932.4, dated Dec. 4, 2009.
Fuhse, Christian, "Combination of Micro Mirrors and Thin Film Color Shift", 2014 Optical Document Security Conference, San Francisco, California, USA, Jan. 29-31, 2014, 8 pages.
German Search Report from Corresponding German Application No. DE 10 2009 056 934.0, Dec. 4, 2009.
International Search Report from Corresponding PCT Application No. PCT/EP2010/007368, dated Jun. 8, 2011 and English Translation thereof.
German Search Report from Corresponding German Application No. 10 2011 108 242.9, Mar. 16, 2012.
International Preliminary Report on Patentability from PCT Application No. PCT/EP2010/007368, dated Jul. 10, 2012.
International Search Report for Corresponding PCT Application No. PCT/EP2012/003059, Oct. 31, 2012.
Kotacka et al., "Synthetic holography at 500.000 dpi: From renaissance of portraits to holographic dust", Optical Document Security, San Francisco, Jan. 23-25, 2008, Reconnaissance International 2008, pp. 1-13.
Lee, "Micro mirror array nanostructures for anti-counterfeiting applications", Optical Security and Counterfeit Deterrence Techniques V, SPIE vol. 5310 c. 2004, pp. 350-368.
Lee, "Colourtone lithography", Mircroelectronic Engineering 61-62 (2002) pp. 105-111.
Leech et al., "Hot embossing of grating-based optically variable images in thermoplastic arcrylic lacquer", Jouran of Materials Science, Springer Science+Business Media, LLC 2007, 7 pages.
Leech et al., "Optically variable micro-mirror arrays fabricated by graytone lithography", Microelectronic Engineering, vol. 83 (2006) pp. 351-356.

(56) References Cited

OTHER PUBLICATIONS

Leech et al., "Printing via hot embossing of optically variable images in thermoplastic acrylic lacquer", Mircoelectronic Engineering vol. 83 (2006) pp. 1961-1965.

Leech et al., "Hot embossing of diffractive optically variable images in biaxially-oriented polypropylene", Mircroelectronic Engineering vol. 84 (2007) pp. 25-30.

van Renesse, "7.2.5 Volume-Reflection Holography" Optical Document Securtiy, Third Edition (2005) pp. 250-252.

Chinese Search Report from Application No. CN 2010800625972, Apr. 21, 2014.

Australian Opposition Proceeding from Application No. 20100327031, Oct. 17, 2014.

Gregory et al., "Random facet Fresnel lenses and mirrors", Optical Engineering, vol. 40 (5), pp. 713-719, May 2001.

* cited by examiner

SECURITY ELEMENT, VALUE DOCUMENT COMPRISING SUCH A SECURITY ELEMENT AND METHOD FOR PRODUCING SUCH A SECURITY ELEMENT

BACKGROUND OF THE INVENTION

A. Field of the Invention

The present invention relates to a security element for a security paper, value document or the like, to a value document having such a security element, and to a method for manufacturing such a security element.

B. Related Art

Objects to be protected are frequently equipped with a security element which permits verification of the authenticity of the object and at the same time serves as protection from unauthorized reproduction.

Objects to be protected are for example security papers, identity documents and value documents (such as e.g. bank notes, chip cards, passports, identification cards, identity cards, shares, investment securities, deeds, vouchers, checks, admission tickets, credit cards, health cards, etc.) as well as product authentication elements, such as e.g. labels, seals, packages, etc.

For such a security element it is known to employ optically variable security inks as are described e.g. in EP 0 227 423 A2. Such security inks contain platelet-shaped pigments with a thin-film interference coating, so that for a viewer the color of the individual pigments depends on the viewing angle. The security inks with the described platelet-shaped pigments can be printed on a bank note such that the pigments are aligned approximately parallel to the surface of the bank note, and the printed area changes its color in accordance with the thin-film coating of the pigments upon tilting of the bank note.

It is further known to provide such pigments with an additional magnetic layer (U.S. Pat. No. 4,838,648), so that the pigments can then be aligned by means of suitable magnets and fixed (U.S. Pat. No. 7,517,578 B2). This makes it possible for the pigments to be aligned parallel to each other substantially more precisely, on the one hand, which leads to a considerably higher chroma (=more brilliant colors). On the other hand, it provides the possibility of orienting the pigments not only parallel to the substrate surface, but in principle in any direction. In particular, the pigments of different regions of the security element can also be aligned in different directions. Depending on the magnet assembly used, there can be achieved between the differently oriented regions relatively abrupt as well as gentle transitions.

From JP 2008-80609 A there is known a further method for aligning the platelet-shaped pigments wherein the security ink with the pigments is so applied to an embossed relief structure that the pigments are aligned approximately parallel to the relief. By suitable design of the relief there can be realized regions with differently oriented pigments and accordingly different colors.

The described optically variable security inks are relatively expensive, on the one hand. On the other hand, the alignment of the pigments via magnets is of course limited, because the magnetic fields necessary for alignment cannot be arbitrarily formed. Further, the security elements cannot be especially finely resolved, which is due to the usually employed screen printing processes, on the one hand, and to the transitions of the necessary magnetic fields not being arbitrarily sharp, on the other hand.

Besides the color change, the security inks also frequently lead to a glitter effect similar to metallic lacquering on automobiles.

BRIEF SUMMARY OF THE INVENTION

On these premises, the invention is based on the object of avoiding the disadvantages of the prior art and in particular providing a security element with which at least one of the described effects (such as e.g. the glitter effect) of the security inks can be obtained without employing security inks.

According to the invention this object is achieved by a security element for a security paper, value document or the like, having a carrier which has a reflective areal region which is divided into a multiplicity of reflective pixels, whereby the area of each pixel is smaller than the area of the reflective areal region by at least one order of magnitude, whereby each pixel has at least one reflective facet which is formed in a surface of the carrier, whereby the at least one reflective facet reflects light incident along a predetermined direction on the areal region directionally in a reflection direction predefined by the orientation of said facet, whereby the orientations of the facets of different pixels have a substantially random variation over the reflective areal region.

"Pixels" are understood here to be small partial regions of the reflective areal region, which can not only have an arbitrary outline form, but in particular need also not be arranged on a regular grid.

The chosen formulation according to which the orientations of the facets of different pixels have a substantially random variation over the reflective areal region takes account of the fact that a random variation can also be realized for example with the help of computer-generated "random numbers" which, strictly speaking, are deterministic.

The substantially random variation of the orientations of the facets is preferably so realized that there is first associated with the pixels e.g. in a region-based manner a certain preferential orientation, starting out from which the orientation of the facets of the individual pixels is then varied for example on the basis of computer-generated random numbers or pseudo-random numbers. It can thus be achieved in particular that the orientations of the facets of individual pixels fluctuate around an average orientation in a region-based manner. The random fluctuation of the orientation can, in special implementation variants, be present only within predefined limits and/or according to a predefined distribution, for example normally or uniformly distributed.

With such a security element it is possible to precisely adjust for each pixel the orientation and thus also the direction in which incident light is reflected, so that a glitter effect can be realized in simple fashion. In the security element of the invention, the reflective area, which can be e.g. a planar or a curved area, can thus still be perceived as a planar or curved area but at the same time shows the desired glitter effect.

The substantially random variation of the orientations of the facets over the reflective areal region is understood here to mean in particular that the reflection directions are different for the majority of the pairs of directly neighboring pixels or also for all pairs of directly neighboring pixels. Preferably, the areal region is at the same time perceptible to a viewer in its actual spatial form.

The security element of the invention can have in particular an optical appearance that practically matches that of magnetically aligned pigments of optically variable security inks. For this purpose, there is chosen a pixel size that corresponds approximately to the size of the pigments employed in such inks, for example 30 µm, and the average orientation of the facets of different pixels is chosen analogously to the average orientation of the pigments. The glitter effect of such inks is based on the individual pigments not reflecting exactly in a predefined direction, but a certain random variation of the reflection directions being present. The orientations of the facets of different pixels in the security element of the invention likewise have such a variation, which results in a comparable glitter effect.

The area of the areal region and the area of the pixels are understood here to be in particular respectively the area upon projection in the direction of the macroscopic surface normal of the areal region onto a plane. Preferably, the area of each pixel is smaller than the area of the reflective areal region by at least two orders of magnitude.

In the security element of the invention, the orientations of the facets of different pixels advantageously have a substantially random variation around different average orientations predefined in a region-based manner.

Several of the pixels preferably respectively have several reflective facets of identical orientation which form a periodic or aperiodic sawtooth grating. It is also possible for all pixels to respectively have several, preferably the same number of, reflective facets of identical orientation.

The facets are preferably configured as substantially planar area elements, which facilitates the manufacture. The chosen formulation according to which the facets are configured as substantially planar area elements takes account of the fact that, for manufacturing reasons, perfectly planar area elements can normally never be manufactured in practice. The facets can alternatively also be configured as curved (e.g. concave, convex or wavy) area elements. The curvature of the area elements is expediently low here.

Orientation is understood here to be in particular the inclination of the reflective facets and/or the azimuth angle of the reflective facets. The orientation of the facets can of course also be determined by other parameters. In particular, the parameters in question are two mutually orthogonal parameters, such as e.g. the two components of the normal vector of the respective facet.

The random variation of the orientations can be effected here in one or two dimensions or spatial directions. The security element of the invention can be configured in particular such that the orientations of the facets of different pixels have a substantially random variation only in one of the parameters determining the orientation of the facets. Thus, the random variation can in particular also relate only to the slope or only to the azimuth angle, or the variation of the orientations of the facets can be chosen such that a reflected light beam incident in a corresponding partial region "fans out" around a predefined rotation direction.

Preferably, the variation of the reflection directions that is predefined by the variation of the orientations of the facets of different pixels amounts to at least about 1°, preferably at least about 3°, particularly preferably at least about 10°.

In the security element of the invention, the reflective facets can have a reflection-enhancing, in particular a reflective, coating. Reflection-enhancing coatings for the purposes of the invention are also coatings that increase the reflectance for example only by about 20% to about 50%, such as e.g. semi-transparent layers, whereas reflective coatings involve a very high reflectance. The reflection-enhancing coating can be a metallic coating, which is vapor-deposited for example. As a coating material there can be employed in particular aluminum, gold, silver, copper, palladium, chromium, nickel and/or tungsten as well as alloys thereof. Alternatively, the reflection-enhancing coating can be formed by a coating with a material with a high refractive index.

In particular there can be formed on the facets at least in certain regions a color-shifting layer. This makes it possible to adjust the desired color-shifting effect to pixel size and thus in a highly resolved manner. According to an advantageous embodiment, color-shifting layers differing in certain regions can also be formed on the facets.

The reflection-enhancing coating as well as the color-shifting layer can be present in the form of patterns, characters or encodings and/or have gaps in the form of patterns, characters or encodings.

The maximum extension of a pixel is preferably between about 5 μm and 5 mm, preferably between 10 μm and 300 μm, particularly preferably between 20 μm and 100 μm.

The width of the sawteeth or, in the case of periodic sawtooth gratings, the grating period per pixel is preferably between 1 μm and 300 μm, preferably between 3 μm and 100 μm, particularly preferably between 5 μm and 30 μm. The width of the sawteeth or the grating period is chosen in particular such that at least two facets of identical orientation are contained per pixel and that diffraction effects practically no longer play a part for incident light (e.g. from the wavelength range of 380 nm to 750 nm). Because no, or no practically relevant, diffraction effects occur, the facets can be designated achromatic facets, or the pixels achromatic pixels, which cause a directionally achromatic reflection. The security element thus has an achromatic reflectivity with regard to the grating structure present through the facets of the pixels, whereby with increasing grating period the security element shows an increasingly more brilliant appearance, i.e. a more pronounced glitter effect. A possibly still present visibility of a diffraction image arising from the sawtooth grating can be minimized—should this be desired—in particular by a variation of the grating period.

The color-shifting layer can be configured in particular as a thin-film system or thin-film interference coating. There can be realized here e.g. a layer sequence of metal layer—dielectric layer—metal layer or a layer sequence of at least three dielectric layers, whereby the refractive index of the middle layer is lower than the refractive index of the two other layers. As a dielectric material there can be employed e.g. ZnS, $SiO_2$, $TiO_2$, $MgF_2$.

The color-shifting layer can also be configured as an interference filter, thin semi-transparent metal layer with selective transmission through plasma resonance effects, nanoparticles, etc. The color-shifting layer can in particular also be realized as a liquid-crystal layer, diffractive relief structure or subwavelength grating. A thin-film system constructed of reflector, dielectric, absorber (formed on the facets in this order or, upon viewing of the security element through the carrier, in the reverse order) is also possible. If the security element is to be viewable from both sides, the layer sequence of absorber/dielectric/reflector/dielectric/absorber is expedient.

In the security element of the invention, at least two facets can preferably be provided per pixel. There can also be three, four, five or more facets.

The security element can be configured in particular such that the azimuth angles of the facets of the individual pixels are randomly distributed values between 0° and 360° (but each facet has the same azimuth angle per pixel). Also, it is possible that the slopes of the facets per pixel are randomly distributed according to a normal distribution (here, too, each facet has the same slope per pixel).

The reflective areal region of the security element can be divided into at least two partial regions or portions in which the pixels have different average orientations, or different average reflection directions predefined by the different average orientations. Thus, all facets can e.g. have the same azimuth angle. In the first of the two partial regions, the inclinations of the facets are then chosen for example randomly between 10° and 20°, while the inclinations of the facets in the second partial region of the two partial regions are chosen between −20° and −10°. Upon tilting of the security element, the first partial region then appears bright in one case and the second partial region in the other case depending on the illumination, i.e. the representation flips from a positive to a negative representation.

Alternatively, it is e.g. also possible that the azimuth angles are uniformly distributed over all possible angles, and the inclinations are different in the two partial regions but respectively fixed, for example 10° in the first partial region and 30° in the second partial region. Such a representation has the special property that although it flips from a positive to a negative representation upon tilting of the security element, such a flip effect is surprisingly lacking upon rotation of the security element within its plane.

When the facets have a color-shifting layer, the colors of the different partial regions can be different, because the color-shifting coating is looked at from different angles.

According to a preferred embodiment, the two partial regions can also be distributed over different, mutually interlaced partial areas. In this way there can be produced for example a so-called tilt image.

Further, with the security element of the invention there can be produced the impression that a "noisy" area is present (preferably in a reflective area). Additionally, the facets of the pixels can be oriented such that there occurs from certain viewing angles a simultaneous bright lighting up of many pixels. For this purpose, the reflective areal region on the carrier is divided into at least two partial regions, so that the pixels in the first partial region have a random orientation, while the pixels of the second or the further partial regions all have the same or at least almost the same orientation respectively per partial region. The light from a light source is then scattered in all directions from many angles in the first partial region, while the light is respectively reflected in a narrow angular range in the further partial regions. A viewer then sees only a noisy representation with randomly lighting up pixels (glitter effect) from most angles, while the further partial regions light up very brightly from certain angles.

With the security element of the invention there is fundamentally provided the possibility of simulating practically all optical effects attainable with magnetically oriented pigments. Thus, there are to be mentioned in particular the "rolling bar" or "double rolling bar" effects stated in U.S. Pat. No. 7,517,578 B2. Expediently, the orientation of the facets is chosen here such that the reflective areal region has a continuous course of the average reflection directions of the pixels. By a suitable combination of the security element of the invention with magnetic materials, for example incorporation of magnetic layers or combination with magnetic inks, there can of course also be provided magnetic properties which can in particular be machine-readable.

Preferably, the attainable optical effects are continued periodically on the security element. Thus, a multiplicity of such effects can be repeated periodically e.g. for a security element configured as a security thread, so that the corresponding effect can be perceived in multiple fashion upon arrangement in a window.

The pixels preferably have a rectangular or square outline form. However, they can also have special other outline forms which become visible under the microscope for example. In particular, the pixels can also have different outline forms. Thus, a portion of the pixels can e.g. have outlines in the form of a symbol or a number.

Preferably, the pixels are arranged in a regular grid.

In at least one portion of the pixels there can additionally be written a motif, e.g. a microtext, a logo or an encoding. The motif can be written here either into the facets, or a small portion of the pixels has no facets but is filled with the motif, e.g. a microtext.

The security element of the invention can be combined with other known security features. For example, an interlaced combination with a hologram, in particular a true-color hologram or a Kinegram, is possible.

According to a preferred embodiment, the security element of the invention can be combined with a micro-optic representation arrangement into a total representation. For example, the security element of the invention can be combined with a micro-optic representation arrangement with microstructures as well as micro-imaging elements for enlarged imaging of the microstructures, e.g. microlens or concave micromirror arrays, or microlens or concave micromirror images.

The facets of the pixels can be configured as a periodic or aperiodic sawtooth structure. In particular, it is possible that the facets are formed by embossing the surface.

The reflective areal region of the security element can have in particular the form of a motif (e.g. letter, number, symbol, etc.).

The security element of the invention can further be equipped with one or several functional layers for use as a security element for security papers, value documents and the like, in particular with a heat-seal finish, with protective layers, e.g. a transparent protective lacquer, cover layers, adhesive layers or layers with visually and/or machine-detectable security features.

There is further provided a value document having the security element of the invention, whereby the security element can be configured according to the developments of the invention.

Besides the simulation of the optical effects attainable with magnetically oriented pigments, such effects can also be combined with the security element of the invention in targeted fashion. Thus, according to an advantageous embodiment, the value document can also have, besides the security element of the invention, a security feature that is based on magnetically aligned, preferably platelet-shaped pigments of optically variable security inks and that has an optical appearance substantially comparable to the appearance of the security element. Such security features can be taken in particular from U.S. Pat. No. 7,517,578 B2, whose disclosure on the manufacture and properties of such security features is incorporated into the present description. The magnetic pigments are normally present here in the form of a motif which contains a region in which the magnetic pigments are aligned relatively to the surface of the ink layer.

Such a substantially comparable optical appearance can consist in particular in there being formed on the facets of the security element at least in certain regions a color-shifting layer, and the color-shifting effect of the color-shifting layer being adjusted such that the color-shift effects of the security element and of the security feature based on magnetically aligned pigments correspond to each other, i.e. have the same color depending on the tilting angle.

Alternatively or additionally, the security element of the invention and the security feature based on magnetically aligned pigments can respectively have a further optical effect, whereby the produced further optical effects correspond to each other.

Preferably, the further optical effect is formed by a kinetic effect. In particular there are to be mentioned here the "rolling bar" or "double rolling bar" effects stated in U.S. Pat. No. 7,517,578 B2. Expediently, the kinetic effects of the security element and of the security feature based on magnetically aligned pigments come about upon tilting of the value document in the parallel direction, in the opposite direction) (180° or in the perpendicular direction to each other.

Other kinetic effects upon tilting of the value document can also be realized, such as e.g. so-called flip, running or pumping effects. The motion is advantageously effected here in the same direction or in the opposite direction. If upon tilting of the value document the security element of the invention and the security feature based on magnetically aligned pigments show for example a pumping effect (concentric motion around a fixed point), either both hence show an extension or both a contraction (same-direction motion) or alternatively the security element shows an extension effect while the security feature based on magnetically aligned pigments contracts (opposite-direction motion). Accordingly, in the case of so-called flip effects, the security element and the security feature based on magnetically aligned pigments flip from a positive to a negative representation upon tilting (same-direction motion), or only the security element flips in this way while the security feature based on magnetically aligned pigments flips from a negative to a positive representation (opposite-direction motion).

Besides kinetic effects, the security element of the invention and the security feature based on magnetically aligned pigments can also show a corresponding three-dimensional effect, as can be taken for example from U.S. Pat. No. 7,517,578 B2.

The security element of the invention and the security feature based on magnetically aligned pigments can be arranged either on the same side of the value document or on opposing sides of the value document. An arrangement on opposing sides of the value document has here the advantage that any minimal color deviations between the security element of the invention and the security feature based on magnetically aligned pigments that might be present are not, or hardly, perceived.

According to a development of the invention, the reflective areal region of the security element as well as the security feature based on magnetically aligned pigments can have the form of a matching motif (e.g. letter, number, symbol, etc.). Preferably, the motifs are formed on the value document in different sizes. For example, the dimensions of the motif of the security feature based on magnetically aligned pigments amounts to about 15 mm and the dimensions of the motif of the security element of the invention configured e.g. as a security thread amounts to about 4 mm.

The invention also comprises a method for manufacturing a security element for security papers, value documents or the like, wherein the surface of a carrier is so height-modulated in an areal region that the areal region is divided into a multiplicity of pixels with respectively at least one facet, and the facets are provided with a coating so as to form reflective facets which reflect light incident along a predetermined direction on the areal region per pixel respectively directionally in a reflection direction predefined by their orientation, whereby the area of each pixel is chosen to be smaller than the area of the areal region by at least one order of magnitude, and whereby the orientation of the facets of different pixels have a substantially random variation over the reflective areal region.

The manufacturing method of the invention can be developed in particular such that the security element of the invention as well as the developments of the security element of the invention can be manufactured.

For producing the height-modulated surface of the carrier there can be employed known microstructuring methods, such as e.g. embossing methods. Thus for example also using methods known from semiconductor fabrication (photolithography, electron beam lithography, laser-beam lithography, etc.) suitable structures in resist materials can be exposed, possibly refined, molded and employed for fabricating embossing tools. There can be used known methods for embossing in thermoplastic foils or into foils coated with radiation-curing lacquers. The carrier can have several layers which are successively applied and optionally structured and/or can be assembled from several parts.

The security element of the invention can be manufactured in particular such that a further, embossed security feature is produced in the same working step. This may be in particular an optically variable security feature, such as e.g. a hologram, a non-noisy sawtooth structure (tilt images, kinematic effects, 3D representations, etc.), microlens or concave micromirror arrays, or microlens or concave micromirror images.

Further, the at least one further security feature can according to the invention be metallized or provided with a metallic coating in the same working step as the facets.

The security element can be configured in particular as a security thread, tear thread, security band, security strip, patch or as a label for application to a security paper, value document or the like. In particular, the security element can span transparent regions or recesses.

The term security paper is understood here to be in particular the not yet circulable precursor to a value document, which can have besides the security element of the invention for example also further authentication features (such as e.g. luminescent substances provided within the volume). Value documents are understood here to be, on the one hand, documents produced from security papers. On the other hand, value documents can also be other documents and objects that can be provided with the security element of the invention in order for the value documents to have uncopiable authentication features, thereby making it possible to check authenticity and at the same time preventing unwanted copying.

There is further provided an embossing tool having an embossing area with which the form of the facets of a security element according to the invention (including its developments) can be embossed into the carrier or into the surface of the carrier.

The embossing area preferably has the inverted form of the surface contour to be embossed, whereby this inverted form is preferably produced by the formation of corresponding depressions.

Further, the security element of the invention can be used as a master for exposing volume holograms or for purely decorative purposes.

To expose the volume hologram, a photosensitive layer in which the volume hologram is to be formed can be brought, directly or through the intermediary of a transparent optical medium, in contact with the front side of the master and thus with the front side of the security element.

Then the photosensitive layer and the master are exposed with a coherent light beam, thereby causing the volume hologram to be written into the photosensitive layer. The procedure can be identical or similar to the procedure for producing a volume hologram as described in DE 10 2006 016 139 A1. The basic procedure is described for example in paragraphs nos. 70 to 79 on pages 7 and 8 of the stated print in connection with FIGS. 1*a*, 1*b*, 2*a* and 2*b*. The total content of DE 10 2006 016 139 A1 with regard to the manufacture of volume holograms is hereby incorporated into the present application.

It is evident that the features mentioned hereinabove and those to be explained hereinafter are usable not only in the stated combinations, but also in other combinations or in isolation, without going beyond the scope of the present invention.

DESCRIPTION OF THE DRAWINGS

Hereinafter the invention will be explained more closely by way of example with reference to the attached figures, which also disclose features essential to the invention. For more clarity, the figures do without a representation that is true to scale and to proportion. There are shown.

DETAILED DESCRIPTION OF PREFERRED EMBODIMENTS OF THE INVENTION

Figure 1:
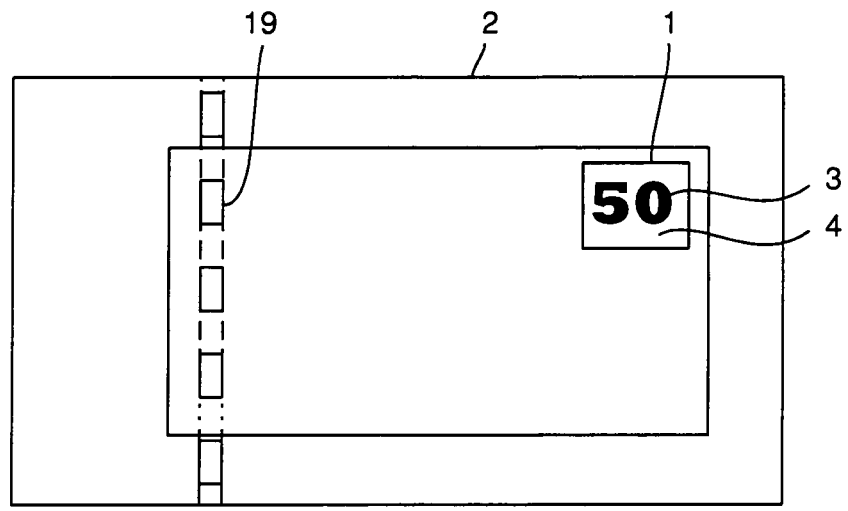
FIG. 1 a plan view of a bank note having a security element 1 according to the invention.

In the embodiment shown in FIG. 1, the security element 1 of the invention is integrated in a bank note 2 such that the security element 1 is visible from the front side of the bank note shown in FIG. 1.

The security element 1, which is configured as a reflective security element with a rectangular outside contour, comprises a first areal region 3 (here the digits of the number 50) as well as a second areal region 4 adjoining the first areal region 3, whereby the two areal regions 3 and 4 together fill the total area that is limited by the rectangular outside contour.

Figure 2:
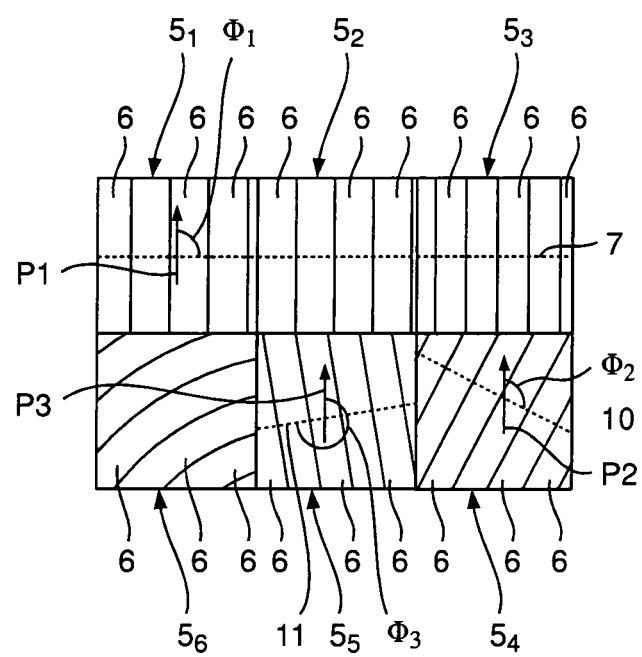
FIG. 2 an enlarged plan view of a part of the first areal region 3 of the security element 1.

The first areal region 3 is divided into a multiplicity of reflective pixels 5 of which a small portion are represented enlarged in FIG. 2 as a plan view. The pixels 5 are square here and have an edge length in the range of 10 to several 100 µm. Preferably, the edge length is no greater than 300 µm. In particular, it can be in the range between 20 to 100 µm.

The edge length of the pixels 5 is so chosen that the area of each pixel 5 is smaller than the area of the first areal region 3 (digits of the number 50) by at least two orders of magnitude.

Each pixel 5 has several reflective facets 6 of identical orientation in the embodiment described here. The facets 6 are the inclined areas of a reflective sawtooth grating. In a modification not represented, however, it is also possible that several or all pixels 5 respectively have only a single facet 6.

Figure 3:
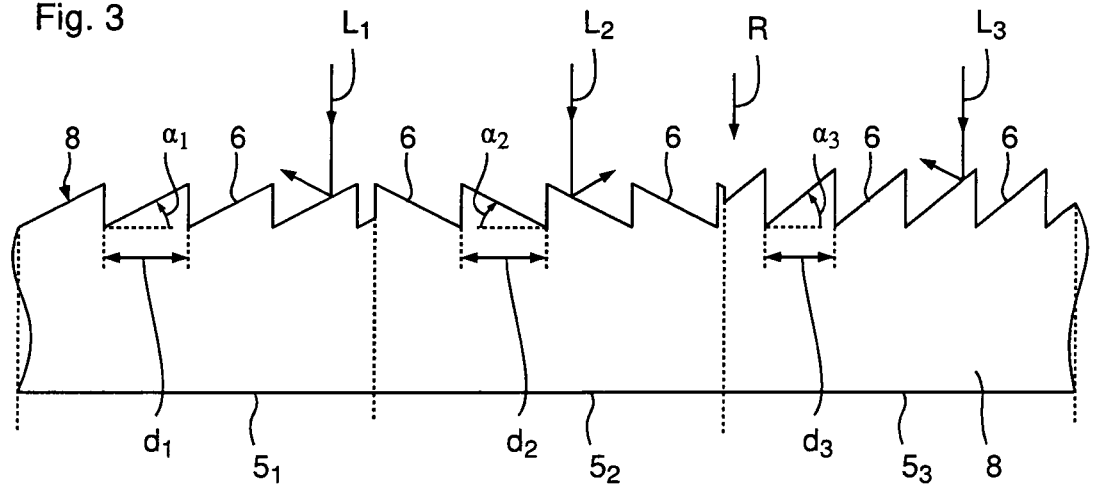
FIG. 3 a cross-sectional view along the line 7 in FIG. 2.

In FIG. 3 there is represented the sectional view along the line 7 for three neighboring pixels $5_1$, $5_2$ and $5_3$, whereby the representation in FIG. 3, as also in the other figures, is not true to scale but in part strongly exaggerated for the sake of better representability. Further, for simplifying the representation in FIG. 3, as also in FIGS. 4 and 5, the reflective coating on the facets 6 is not drawn in.

The sawtooth grating of the pixels $5_1$, $5_2$ and $5_3$ is formed in an upper side 8 of a carrier 9, whereby the thus structured upper side is preferably coated with a reflective coating. The carrier 9 may be e.g. a radiation-curing plastic (UV resin) which is applied to a carrier foil not shown (for example a PET foil).

As to be seen in FIG. 3, the inclination α of the facets 6 is identical in each individual pixel $5_1$, $5_2$ and $5_3$. However, the inclination of facets 6 of neighboring pixels $5_1$, $5_2$, $5_3$ is different. Furthermore, the grating period $d_3$ of the sawtooth structure of the pixel $5_3$ is also different from the grating periods $d_1$ and $d_2$ of the sawtooth structures of the pixels $5_1$ and $5_2$. Due to the different orientation of the facets 6 of the individual pixels $5_1$, $5_2$ and $5_3$, light $L_1$, $L_2$, $L_3$ incident along a predetermined direction R is reflected by each pixel $5_1$, $5_2$, $5_3$ directionally in different reflection directions, as represented schematically in FIG. 3. Because the facets 6 of the pixels 5 of the first areal region 3 are always oriented differently, there is obtained for the viewer a glittering effect or an effect comparable with a metallic lacquering.

The different orientation of the facets 6 can be adjusted not only by the choice of the angle of inclination α of the facets 6, but also by different azimuth angles Φ. Relative to the direction according to the arrow P1 in FIG. 2, the azimuth angle $Φ_1$ of the facets 6 of the pixels $5_1$, $5_2$ and $5_3$ respectively amounts to 90°.

Figure 4:
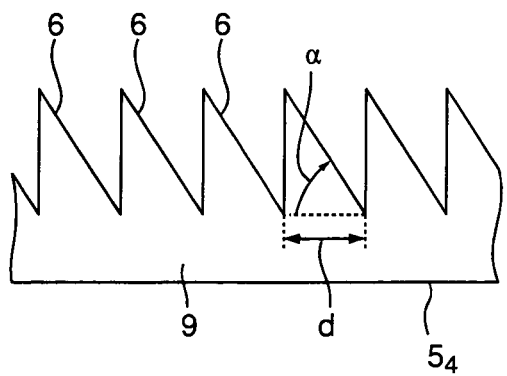
FIG. 4 a cross-sectional view along the line 10 in FIG. 2.
Figure 5:
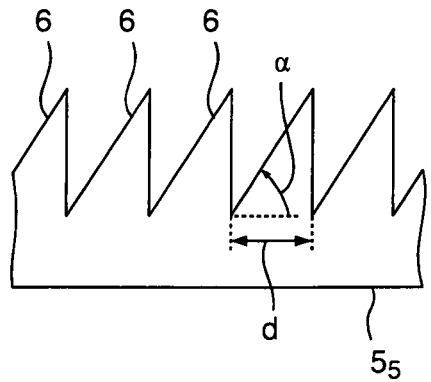
FIG. 5 a cross-sectional view along the line 11 in FIG. 2.

The azimuth angle $Φ_2$ of the facets 6 of the pixel $5_4$ amounts to approx. 120° (relative to the direction of the arrow P2), however, and the azimuth angle ($D_3$ of the facets of the pixel $5_5$ amounts to approx. 280° (relative to the direction of the arrow P3). The sectional views along the lines 10, 11 of the pixels $5_4$ and $5_5$ are represented in FIGS. 4 and 5.

Through the thus existing different orientation of the individual facets 6 in the pixels 5, the above-described glitter effect is achieved upon viewing of the first areal region 3.

The second areal region 4 can be configured as a normally reflective planar area, so that the digits of the number 50 (first areal region 3) stand out clearly from the second areal region 4 on account of the described effect.

The azimuth angles can for example be chosen randomly for the individual pixels 5. In particular, random values between 0 and 360° can be selected. For the slope α of the facets 6 there can be chosen for example values from the range of 10° to 20° and from the range of −20° to −10°. It is also possible to choose the slope of the facets from a range of for example −20° to 20°. Here, too, the slopes can again be chosen randomly.

It is possible that the randomly chosen slope α corresponds to a normal distribution. The randomly chosen azimuth angles Φ can in particular be uniformly distributed. The grating period or width of the sawteeth d is preferably above 1 µm and in particular above 3 µm. Further, the grating period d can also be above 5 µm. However, it is preferably always so chosen that at least two facets 6 are present per pixel 5. In particular, at least three, four, or more facets 6 can be contained per pixel 5.

The facets 6 are preferably configured as planar area elements. It is also possible, however, that the facets 6 are curved (e.g. concave or convex). The facets 6 can extend straight, as shown for the facets 6 of the pixels 5₁-5₅ in FIG. 2. However, a non-straight course (e.g. slightly curved) is also possible, as schematically shown for the pixel 5₆ in FIG. 2.

Figure 6:
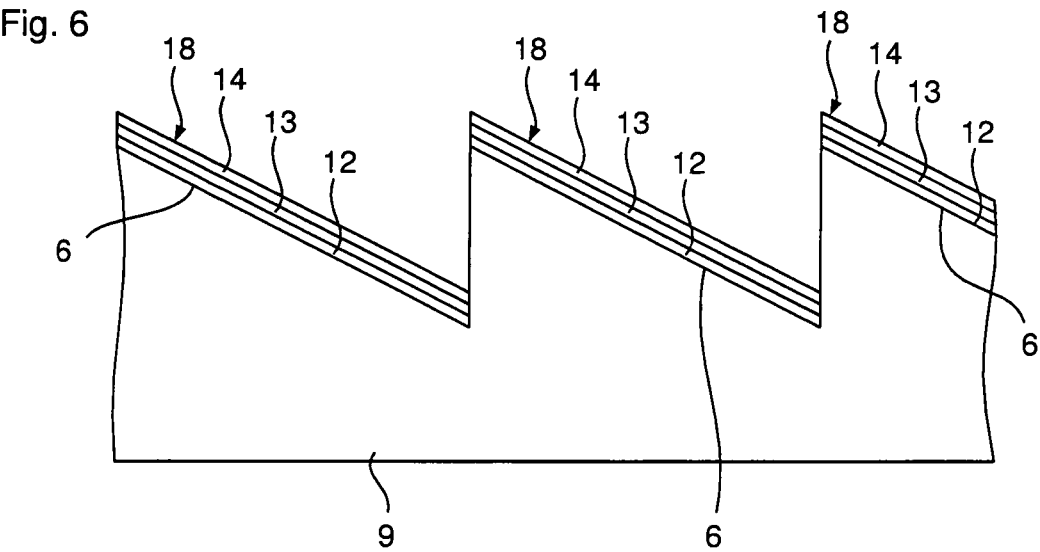
FIG. 6 a cross-sectional view for explaining the formation of a color-shift thin-film system on the facets.
Figure 7:
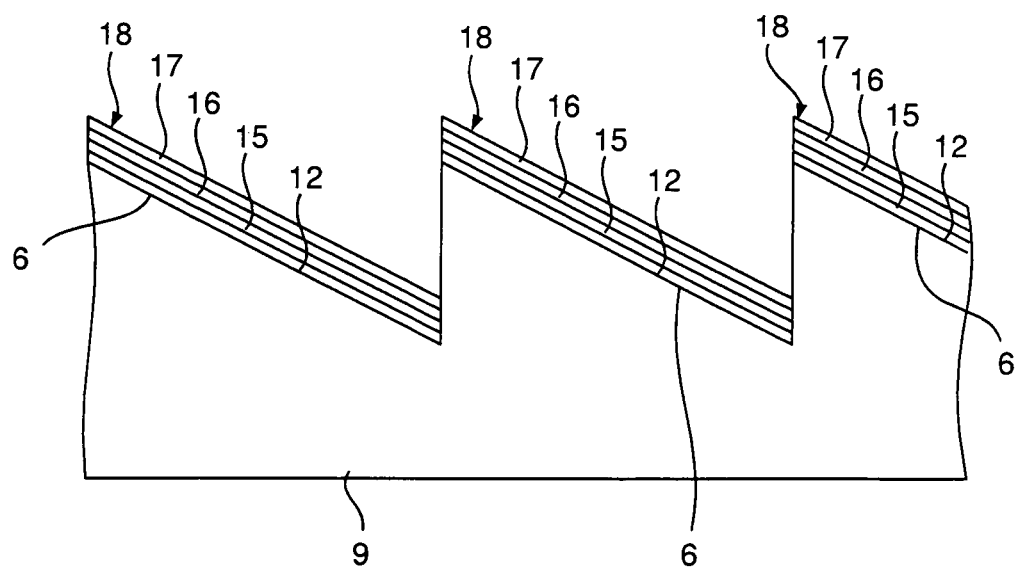
FIG. 7 a further sectional view for explaining a further color-shift thin-film system on the facets.

Furthermore, a color-shift thin-film system 18 or a thin-film system 18 can be vapor-deposited on the upper side 8 or on the reflective coating 12 on the upper side 8, as indicated in FIG. 6. The reflective coating 12 can be configured as a metal film on which there are provided a dielectric layer 13 as well as an upper metal layer 14 which is partly transparent. It is of course also possible to form on the metal film 12 a dielectric thin-film system comprising first, second and third layers 15, 16, 17, whereby the first and third layers 15, 17 have a higher refractive index than the second layer 16 (FIG. 7).

With such a construction it is possible to replace known security inks in which platelet-shaped pigments with a thin-film interference coating change their color depending on the viewing angle. A comparable optical effect is obtained, whereby the optically perceptible quality is considerably better in comparison to security inks. Considerably more brilliant colors can be produced with the security element of the invention.

Figure 8A:
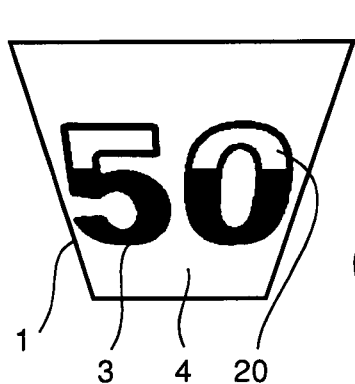
FIGS. 8a-8c views of a security element according to the invention according to a further embodiment in different tilted positions.
Figure 8B:
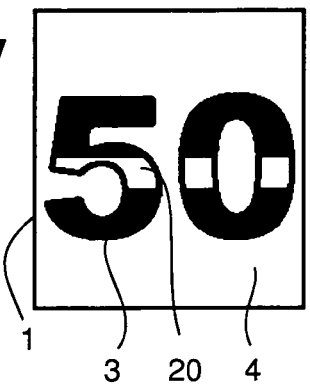

In FIG. 8b there is shown a development of the security element 1 of the invention. The orientation of the facets 6 is so chosen here that they respectively have only a relatively small angle of inclination in the region of the middle stripe represented in white. For example, angles of inclination can be chosen from the range of ±5°. The further away the facets 6 are from the middle, the greater the average angle of inclination becomes, whereby the angles of inclination continuously increase in the upward direction in FIG. 8b and continuously decrease in the downward direction in FIG. 8b. In other words, the limits of the range from which the angles of inclination can be chosen shift toward greater angles of inclination with increasing distance from the middle. The azimuth angles are respectively chosen here from such a range that the average angle of reflection is upward in the upper region and downward in the lower region.

Looking perpendicularly, upon perpendicular illumination, at the security element 1 shown in FIG. 8b, the digits of the number 50 appear brighter in the region of the middle stripe 20 than in the other regions, which is indicated by the white representation. The described glittering effect of course also still occurs, because the pixels still have different reflection directions (here within the described limits).

Figure 8C:
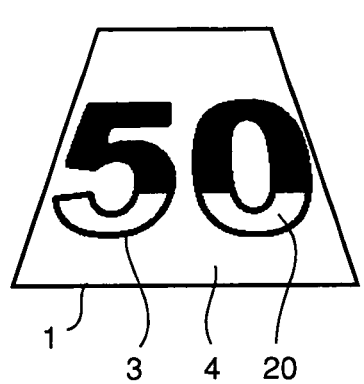

Now tilting the security element 1, the stripe 20 apparently rolls upward or downward during the tilting. In FIG. 8a there is shown a tilted position in which the lower region of the security element 1 is tilted into the sheet plane and thus the upper part of the security element 1 tilted out of the sheet plane. In this case, the stripe 20 has apparently traveled upward. In FIG. 8c there is shown the opposite tilt, at which the upper part is tilted into the sheet plane and the lower part of the security element tilted out of the sheet plane. In this case, the stripe 20 has apparently traveled downward. Such an effect is also designated "rolling bar".

In particular when the security element 1 is configured as a security thread 19 (FIG. 1) it is expedient to use arrangements in which there are not only individual stripes 20 traveling upon tilting, but the effect is periodically continued. Thus, for example for a security thread 19 emerging on the surface of the bank note 2 in certain window regions, a multiplicity of such effects can be repeated periodically at an e.g. 5 mm repeat. In a window region with e.g. a 10 mm height, the effect can hence always be perceived at least twice, i.e. there are always at least two bright stripes 20 to be seen.

Figure 9A:
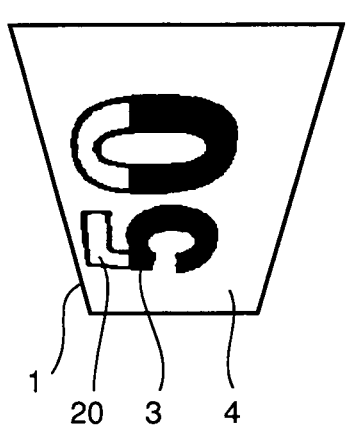
FIGS. 9a-9c views of a security element according to the invention according to yet a further embodiment in different tilted positions, and FIG. 10 a plan view of a further embodiment of the security element of the invention.
Figure 9B:
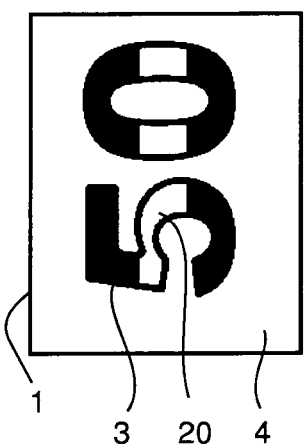
Figure 9C:
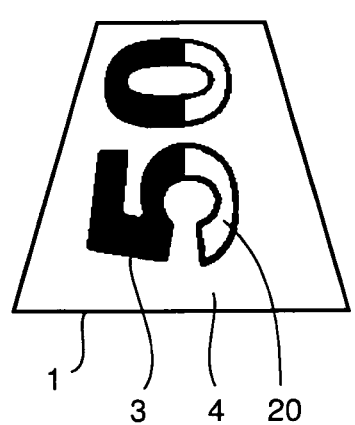

It is of course also possible to predefine the average orientation of the facets of the individual pixels such that upon a tilting of the security element 1 a bar extending perpendicularly to the tilting axis moves along the tilting axis. This case is indicated in FIGS. 9a to 9c. In FIG. 9b the appearance of the security element 1 is represented upon perpendicular viewing and illumination. There is a middle stripe 20 present which, in this tilted position, appears brighter than the remaining regions of the first areal region 3 and which extends vertically here.

When the security element 1 is now tilted (FIG. 9a shows the tilt at which the lower side is tilted into the sheet plane, and FIG. 9c shows the tilt at which the lower side is tilted out of the sheet plane), the vertical bar 20 apparently travels from the left to the right.

The average inclination in the region of the stripe 20 is relatively low at the position of FIG. 9b and respectively increases continuously to the right and left. The azimuth angles are so chosen here that the facets are aligned upward in the left region for example, and downward in the right region for example. Thus, the described effect can be obtained, whereby here, too, the glittering impression is again obtained due to the random variation of the orientation of the facets of different pixels, even if only a certain narrow variation range is predefined per region.

According to an embodiment not shown here, the security element 1 can be arranged on a bank note 2 which further contains a security feature that is based on preferably platelet-shaped magnetic pigments which are aligned relative to the surface of the bank note such that they show a so-called "rolling bar" effect. Such alignments can be taken in particular from U.S. Pat. No. 7,517,578 B2. The security element 1 and the magnetic security feature are arranged here relative to each other such that the bright stripe of the security element 1 and the bright stripe of the magnetic security feature travel in mutually perpendicular directions upon tilting of the bank note 2.

Besides the described, moving stripe upon tilting of the security element, there can of course also be realized other known kinetic effects upon tilting of the security element 1, such as e.g. so-called flip, running or pumping effects.

Some of the above-described effects are impossible, or at least very difficult, to realize with conventionally known pigment inks.

The security element of the invention can be manufactured by first dividing the first areal region 3 computationally into the pixels 5. Then a desired orientation is predefined computationally for each pixel 5. Said orientation can correspond e.g. to the average expected orientation of a pigment of known security inks. In particular, a grating period or the width of the sawteeth d can be predefined. The substantially random variation of the orientations of the facets 6 is then preferably so realized that, starting out from such a preferential orientation, the orientation of the facets 6 of the individual pixels 5 is then varied for example on the basis of computer-generated random numbers or pseudo-random numbers. It can thus be achieved in particular that the orientations of the facets 6 of individual pixels 5 fluctuate around a predefined average orientation. The random variations of the orientation can be effected in one or two dimensions or spatial directions. Thus, the variation can in particular also relate only to the slope α or only to the azimuth angle Φ, or the variation of the orientations of the facets 6 can be chosen such that a reflected light beam incident in a corresponding partial region fans out around a predefined rotation direction. On the basis of these data the sawtooth structures of the individual pixels 5 can then be produced for example by means of gray scale lithography. This structure can then be electroformed and embossed on foil in UV lacquer 9 by mass production. Subsequently, the metal film 12 is vapor-deposited and then optionally the thin-film interference coating 18.

In the security element 1 of the invention, the orientations of the facets 6 of the pixels 5 can be produced with high exactness, so that a very fine resolution can be obtained on the small length scale of the pixels 5. In particular, arbitrarily sharp or gentle transitions can be produced by the individual pixels 5. The orientation can be defined in the described way for each facet 6, and the security element 1 can then be manufactured according to this definition.

The security element 1 of the invention can also be configured as a security thread 19 (FIG. 1). Further, the security element 1 can not only, as described, be formed on a carrier foil from which it can be transferred to the value document in the known way. It is also possible to form the security element 1 directly on the value document. It is thus possible to carry out a direct printing with subsequent embossing of the security element onto a polymer substrate, in order to form a security element according to the invention on plastic bank notes for example. The security element of the invention can be formed in many different substrates. In particular, it can be formed in or on a paper substrate, a paper with synthetic fibers, i.e. paper with a content x of polymeric material in the range of 0<x<100 wt %, a plastic foil, e.g. a foil of polyethylene (PE), polyethylene terephthalate (PET), polybutylene terephthalate (PBT), polyethylene naphthalate (PEN), polypropylene (PP) or polyamide (PA), or a multilayer composite, in particular a composite of several different foils (compound composite) or a paper-foil composite (foil/paper/foil or paper/foil/paper), whereby the security element can be provided in or on or between each of the layers of such a multilayer composite.

Figure 10:
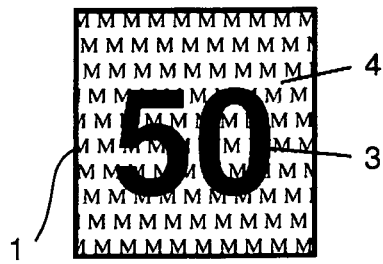

In FIG. 10 there is shown in plan view a further embodiment of the security element 1 of the invention wherein the first areal region 3 is again formed by the digits of the number 50 and the second areal region 4 is adjacent to the first areal region 3 such that the two areal regions 3 and 4 together fill the total area that is limited by the rectangular outside contour of the optically variable area pattern 1. The first region 3 can be configured in the ways described in connection with FIGS. 1 to 9, so that for example the glittering effect of the invention and/or the described noisy representation can be achieved. In particular the "rolling bar effect" described in connection with FIGS. 8a-8c can be provided.

The second areal region 4 is configured here as a moiré magnification arrangement, which will hereinafter be described in detail, which represents the letter "M" for the viewer with absolute depth information. This results for the viewer in a total representation in which the two areal regions 3, 4 or the individual representations presented by the areal regions 3 and 4 yield a total image, whereby the two areal regions 3, 4 preferably adjoin each other directly.

Advantageously, the two areal regions can be combined on the same carrier 9 (which can be configured e.g. as a foil strip) and in particular be embossed by the same operations.

Figure 11:
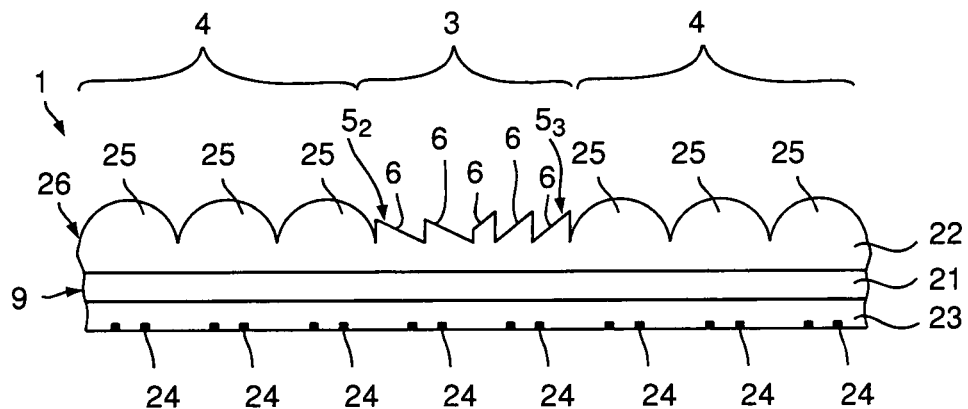
FIG. 11 a schematic sectional view of the security element of FIG. 10.

In FIG. 11 there is represented a schematic sectional view of the security element 1 according to FIG. 10, whereby the sectional view shows a portion of the first areal region 3 which is adjoined on both sides by the second areal region 4. The sectional view according to FIG. 11 is purely schematic and not true to scale and serves essentially to explain the construction.

As indicated by the sectional view according to FIG. 11, the carrier 9 has a carrier foil 21 (which can be for example a PET foil) as well as upper and lower embossing lacquer layers 22, 23.

In the region of the first areal region 3, facets 6 of the pixels $5_2$ and $5_3$ are represented schematically. By means of the facets 6 the desired reflection of the individual pixels $5_2$, $5_3$ is obtained.

To present the letter "M" with the desired absolute depth information in the second areal region 4, there are formed in the lower embossing lacquer layer 23 microstructures 24 which can in particular be filled with ink. The microstructures 24 are arranged in a plane perpendicular to the drawing plane of FIG. 11 in a grid with fixed geometry (here for example a hexagonal grid) and thus areally in a first microstructure pattern.

The upper embossing lacquer layer 22 is so configured that it has a multiplicity of microlenses 25 in the second areal region 4. The microlenses 25 are arranged in a plane perpendicular to the drawing plane of FIG. 11 in a grid with fixed geometry (here for example a hexagonal grid) and thus areally in a first pattern, whereby the first pattern is so adjusted to the first microstructure pattern and the two patterns are so aligned with each other that upon viewing of the security element 1 the microlenses 25 form together with the microstructures 24 a moiré magnification arrangement. The basic principle of a moiré magnification arrangement is described for example in WO 2006/087138 A1, whose total content is hereby incorporated.

Figure 12:
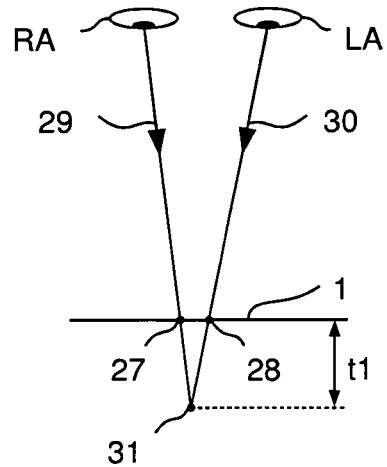
FIG. 12 a schematic view for explaining the mode of function of the micro-optic representation arrangement in the second areal region of the security element of the invention.

The moiré magnification arrangement in the second areal portion 4 forms a micro-optic representation arrangement 26, with which, as to be described in detail hereinafter, the letter "M" is so represented to the viewer in multiple fashion here that it appears behind the security element 1. This is obtained by the viewer's left and right eyes LA and RA being presented different views of the object to be represented (here the letter "M") which respectively show the object viewed from the corresponding direction. In FIG. 12, for simplifying the representation, the object is drawn in as a point, whereby the viewer's right eye RA sees the object at the position 27 and the viewer's left eye LA sees the object at the position 28. Thus, the viewer sees the object with his two eyes from the different directions 29, 30 which intersect at the position 31, so that for the viewer the object is located at the position 31 and hence at distance t1 behind the security element 1. For the viewer there thus results absolute depth information for the object.

With the second areal region 4 there is thus obtained e.g. at a constant viewing angle a representation independent of the illumination direction, while in the first areal region 3 there occurs e.g. the glittering effect at a varying illumination direction.

Through the moiré magnification arrangement in the second areal region 4 there is obtained an absolute depth effect by which the periodically recurring letter "M" located at the depth t1 is represented to the viewer. The microstructures 24 can, as mentioned above, preferably be filled with ink, so that the letters "M", on the one hand, and the remaining region of the second areal region 4, on the other hand, appear matt but of different color.

The micro-optic representation arrangement 26 can be configured not only as a moiré magnification arrangement, but for example also as a modulo magnification arrangement, as described e.g. in WO 2009/000528 A1. The content with regard to the formation of a modulo magnification arrangement of WO 2009/000528 A1 is hereby incorporated into the present application. With a modulo magnification arrangement the image to be represented need not necessarily be composed of a grating of periodically repeating single motifs, in contrast to a moiré magnification arrangement. A complex single image with high resolution can be represented. In the moiré magnification arrangement, the image to be represented normally consists of single motifs (here microstructures 24) which are arranged periodically in a grating and which are represented in magnified form by the lenses 25, whereby the area associated with each single motif maximally corresponds approximately to the area of the corresponding lens cell.

In the described embodiment, the microlenses 25 as well as the sawtooth structures for the reflective facets 6 can be produced simultaneously side by side by means of only a single embossing of the embossed layer 22. Subsequently, the facets 6 only need to be metallized in order that they act reflectively. The construction according to FIG. 11 is hence quick to manufacture.

Figure 13:
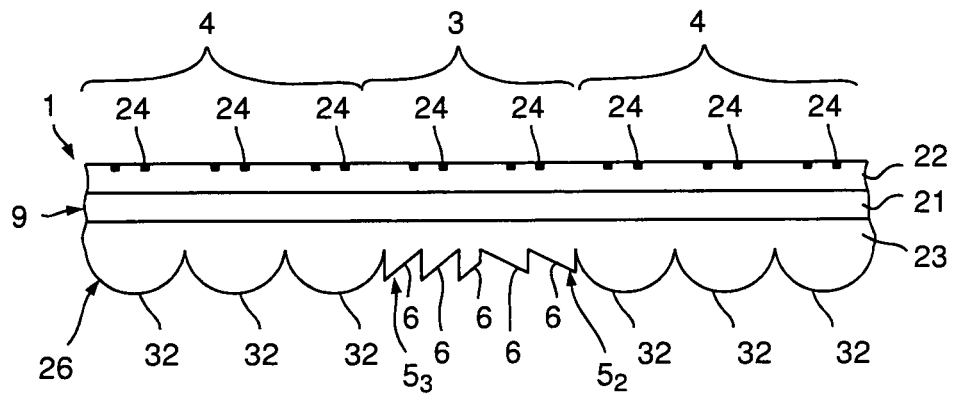
FIG. 13 a schematic sectional view of a further embodiment of the security element of the invention.

In FIG. 13 there is shown a modification of the security element 1 of the invention wherein the micro-optic representation arrangement 26 has, instead of the microlenses 25, concave mirrors 32 which are formed by embossing of the lower embossing lacquer layer 23 and application of a mirroring coating.

The facets 6 of the pixels $5_2$, $5_3$ are also formed on the lower embossing lacquer layer 23. They can be formed in the same way as the concave micromirrors 32 by embossing and mirror-coating. Preferably, the concave micromirrors 32 and the facets are embossed in the same step and mirror-coated in the same step.

The microstructures 24 can be provided not only in the second areal region 4, but also in the first areal region 3 and thus above the facets 6. This facilitates the manufacture of the security element 1. However, they can also be omitted.

If the microstructures 24 are provided in the first areal region 3 and filled with an ink, the first areal region 3 can (but does not have to) likewise appear slightly colored.

Figure 14:
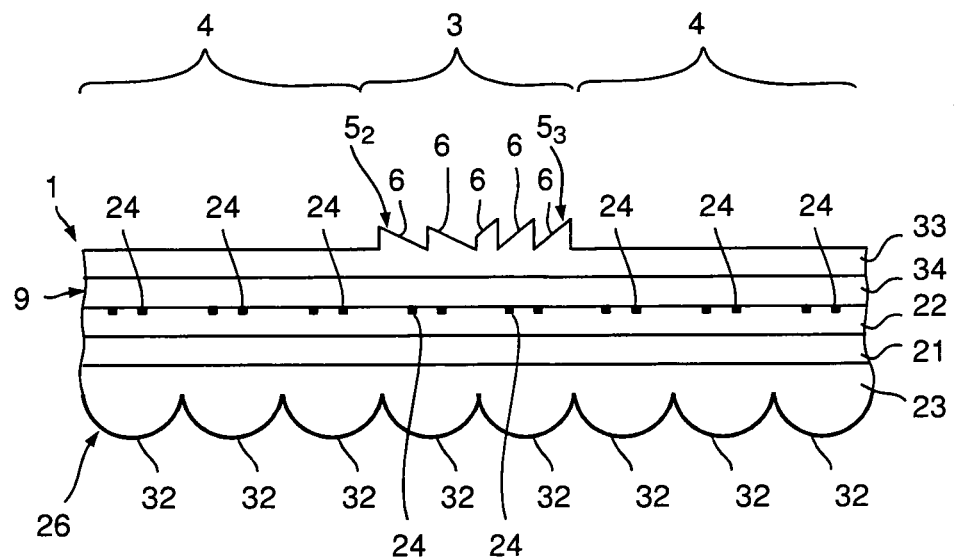
FIG. 14 a sectional view of a further embodiment of the security element of the invention.

In FIG. 14 there is shown a construction of the security element 1 wherein the concave micromirrors 32, the microstructures 24 and the facets 6 are respectively embossed separately in their own embossing lacquer layers 23, 22 and 33. Between the embossing lacquer layers 23 and 22 there is provided a first carrier foil 21 and between the embossing lacquer layers 22 and 33 a second carrier foil 34.

This construction requires more working steps for manufacture in comparison to the variants according to FIGS. 11 and 13, but offers the advantage that the origination of the concave micromirrors 32 and of the facets 6 can be effected separately from each other. The original of the concave micromirrors 32 can even be the same in different designs, because there is always only required a homogeneous area covered with concave micromirrors 32. Once an original with very good imaging properties has been manufactured, it can be utilized for manufacturing many different security elements 1. Further, the concave micromirrors 32 and the facets 6 can be metallized differently, for example with different metals or coatings with color-shifting effects (e.g. thin-film systems in which the color varies in dependence on the viewing angle).

In the variants according to FIGS. 13 and 14 with the concave micromirrors 32, a further protective lacquer layer (not shown) can further advantageously be provided on the upper side or underside of the security element 1, so that the resistance as well as the protection from molding by forgers can be increased.

Figure 15:
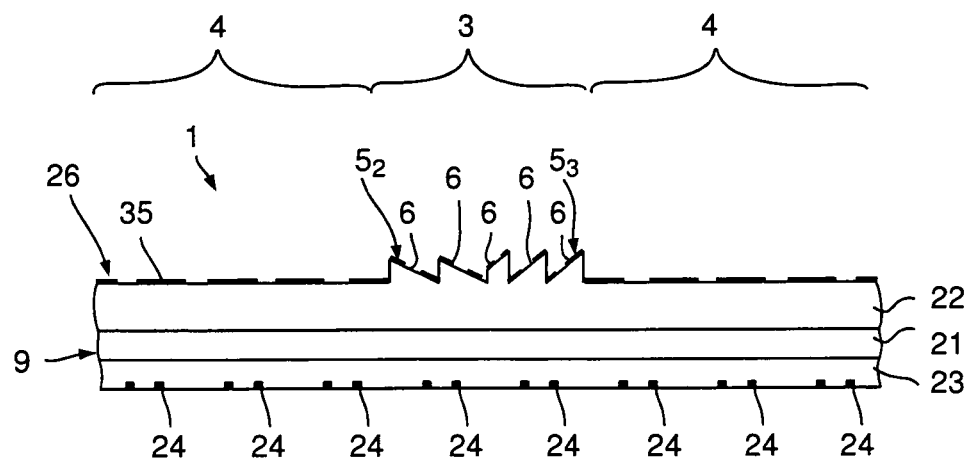
FIG. 15 a sectional view of a further embodiment of the security element of the invention, and FIG. 16 a schematic sectional view of an embossing tool for manufacturing the security element of the invention according to FIG. 11.

In particular upon the viewing of the security element 1 in transmitted light against a bright light source, the micro-optic representation arrangement 26 can also have, instead of a microfocusing element grid (grid of the microlenses 25 or grid of the concave micromirrors 32), only a hole grid 35, as shown in FIG. 15. Such a hole grid 35 can be realized for example by periodically arranged holes or slots in an opaque, for example reflectively metallized, layer. The holes here can be small gaps. In this case, the holes can be designated positive holes. There can also be provided so-called negative holes, which holes are small, non-transparent or non-mirroring regions.

In the embodiment shown in FIG. 15, the hole grid also extends into the first areal region 3, so that a superimposition of the representations results in the first areal region 3. The security element 1 can of course also be configured such that no hole grid is present in the first areal region 3.

Further, in the security element 1 of the invention, the micro-optic representation arrangement 26 can be realized by means of diffractive structures. Thus, there can be provided for example a hologram with a stereographic 3D representation which is constructed from microscopically small sine gratings.

Alternatively, the object represented by means of the micro-optic representation arrangement 26 can also apparently lie or float in front of the security element 1.

The micro-optic representation arrangement 26 and/or the facets 6 can be provided wholly or partly with a color-shifting coating, in particular a thin-film with reflector/dielectric/absorber. This makes it possible to further enhance the optical attractiveness and further increase the forgery resistance.

In the embodiment examples hitherto described, the micro-optic representation arrangement 26 in the second areal region 4 was respectively configured so as to obtain a stereographic representation with depth information. This is understood here to mean representations in which a three-dimensional effect is generated by the security element 1 providing the viewer's left and right eyes with different views of an object which respectively show the object viewed from the corresponding direction. From these different views there then results absolute depth information for a viewer, resulting altogether in a three-dimensional impression. The employed representations in this class can often have more than only two different views, which usually also results in a parallax (i.e. upon rotation the image components in the foreground move relative to the image components in the image background). In some cases one can for example, by rotation, also look behind an object that is in the foreground.

This can be realized technically by three-dimensional holograms, for example directly exposed holograms or computer-generated stereograms. Further examples are microlens tilt images and moiré magnification arrangements with a depth effect or kinetic effect, as described e.g. in WO 2007/076952 A2 or WO 2009/000527 A1.

In a further embodiment, the micro-optic representation arrangement 26 can now be configured such that the parallax does not correspond exactly to the parallax of an object located in depth. This can be realized for example by moiré magnification arrangements or modulo magnification arrangements. It can thereby be achieved that upon tilting or rotation of the security element 1 an additional kinetic effect occurs in the second areal region 4. This may be an orthoparallactic motion, as described e.g. in WO 2007/076952 A2, whereby the representations for the viewer's left and right eyes permit no assignment of a depth, strictly speaking, because the viewing directions from which the observer sees the object with his left and right eyes do not intersect. In a preferred variant, only a relatively small error of the parallax is present, so that the viewing directions (29 and 30 in FIG. 12) almost intersect and the viewer sees an object that moves upon tilting or rotation of the security element 1, but which he, despite the parallax error, ranges clearly e.g. at a depth located behind the plane of the security element 1.

In the A matrix formalism of the application WO 2009/ 000528 A1, a representation with correct parallax corresponds to a representation with an A matrix which is only populated on the diagonal. In an orthoparallactic representation the A matrix is only populated at the places not located on the diagonal. A small parallax error is present when the A matrix is populated on the diagonal as well as therebeside.

In a further embodiment of the security element 1, the representation by means of the micro-optic representation arrangement 26 can change from a first image to a second image upon tilting or rotation of the security element 1. Thus, for example an image, located in depth, of a first symbol A could tilt into at least one other representation, for example a symbol B, upon tilting of the security element 1.

The micro-optic representation arrangement 26 can also realize additional effects besides a three-dimensional effect, for example tilt images or kinematic effects (motions, pumping effect, etc.). In the above-mentioned modulo magnification arrangements, the three-dimensional representation in the second areal region 4 can move upon tilting of the security element 1. Alternatively, as of a certain tilting angle the representation could also tilt into the representation of a completely different object not necessarily likewise appearing three-dimensionally (for example a number located in depth can change to another representation, for example a symbol then moving upon further tilting).

It is especially advantageous in the embodiments where the micro-optic representation arrangement 26 and the facets 6 are embossed into the same embossing lacquer layer 22 (FIGS. 11 and 14) that a micro-optic representation arrangement 26 can be upgraded to the security element 1 of the invention with extremely little effort. It is merely necessary to write the facets 6 additionally between or beside the microlenses 25 or concave micromirrors 32 upon origination.

The security element 1 of the invention can also be designated an optically variable area pattern and used e.g. for purely decorative purposes.

Figure 16:
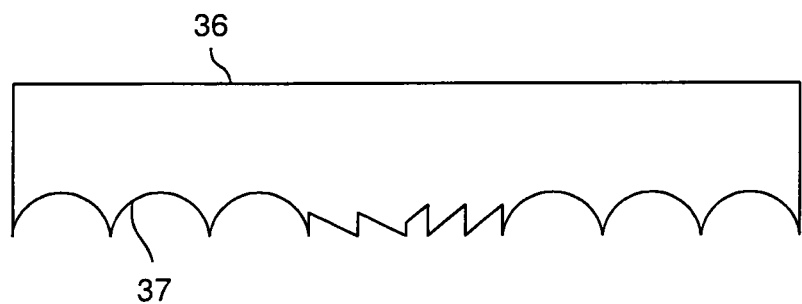

In FIG. 16 there is shown schematically an embossing tool 36 with which the facets 6 as well as the microlenses 25 can be embossed in the upper embossing lacquer layer 22 of the security element 1 according to FIG. 11. For this purpose, the embossing tool 36 has an embossing area 37 in which the inverted form of the surface structure to be embossed is formed.

A corresponding embossing tool can of course not only be provided for the embodiment according to FIG. 11. An embossing tool can also be made available in the same manner for the other described embodiments.

List of reference signs

| | |
|---|---|
| 1 | Security element |
| 2 | Bank note |
| 3 | First areal region |
| 4 | Second areal region |
| 5 | Pixel |
| 6 | Facet |
| 7 | Line |
| 8 | Upper side |
| 9 | Carrier |
| 10 | Line |
| 11 | Line |
| 12 | Reflective coating |
| 13 | Dielectric layer |
| 14 | Upper metal layer |
| 15 | First layer |
| 16 | Second layer |
| 17 | Third layer |
| 18 | Thin-film system |
| 19 | Security thread |
| 20 | Stripe |
| d | Grating period |
| α | Inclination |
| Φ | Azimuth angle |
| P1 | Direction |
| P2 | Direction |
| P3 | Direction |
| L | Incident light |
| R | Direction of incidence |
| 21 | Carrier foil |
| 22 | Upper embossing lacquer layer |
| 23 | Lower embossing lacquer layer |
| 24 | Microstructures |
| 25 | Microlenses |
| 26 | Micro-optic representation arrangement |
| 27 | Position |
| 28 | Position |
| 29 | Viewing direction |
| 30 | Viewing direction |
| 31 | Position |
| 32 | Concave mirror |
| 33 | Embossing lacquer layer |
| 34 | Second carrier foil |
| 35 | Hole grid |
| 36 | Embossing tool |
| 37 | Embossing area |
| RA | Right eye |
| LA | Left eye |

The invention claimed is:

1. A security element for a security paper, the security element comprising
a carrier having a reflective areal region which is divided into a multiplicity of reflective pixels,
the area of each pixel being smaller than the area of the reflective areal region by at least one order of magnitude,
each pixel comprising at least one reflective facet which is formed in a surface of the carrier, the at least one reflective facet reflecting light incident along a predetermined direction on the areal region directionally in a reflection direction predefined by the orientation of said facet, and
the orientations of the facets of different pixels having a random variation over the reflective areal region,
wherein the orientations of the facets of different pixels have a random variation around different average orientations predefined in a region-based manner, resulting in regionally different average reflection directions of the pixels.

2. The security element according to claim 1, wherein several of the pixels respectively have several reflective facets of identical orientation which form a periodic or aperiodic sawtooth grating.

3. The security element according to claim 1, wherein the facets are configured as substantially planar area elements.

4. The security element according to claim 1, wherein orientations of the facets of different pixels is random only in one of the parameters determining the orientation of the facets.

5. The security element according to claim 1, wherein the variation of the reflection directions that is predefined by the random variation of the orientations of the facets of different pixels amounts to at least about 1°.

6. The security element according to claim 1, wherein when there are provided several facets per pixel which form a periodic or aperiodic sawtooth grating, the width of the sawteeth is between about 1 μm and about 300 μm.

7. The security element according to claim 1, wherein the pixels are arranged on a regular grid.

8. The security element according to claim 1, wherein there is formed on the facets at least in certain regions a reflection-enhancing coating.

9. The security element according to claim 1, wherein there is formed on the facets at least in certain regions a color-shifting layer.

10. The security element according to claim 1, wherein the maximum extension of a pixel is between 5 μm and 5 mm.

11. The security element according to claim 1, wherein the reflective areal region is divided into at least two portions which have different average reflection directions of the pixels that are predefined by different average orientations.

12. The security element according to claim 11, wherein the at least two portions with different average reflection directions are distributed over different, mutually interlaced partial areas.

13. The security element according to claim 1, wherein the orientation of the facets is such that the reflective areal region has a continuous course of the average reflection directions of the pixels.

14. The security element according to claim 1, wherein the security element is combined with a micro-optic representation arrangement into a total representation.

15. A value document comprising the security element recited in claim 1.

16. The value document according to claim 15, comprising a security feature which is based on magnetically aligned pigments of optically variable security inks and which has an optical appearance substantially comparable with the appearance of the security element.

17. The value document according to claim 15, wherein there is formed on the facets of the security element at least in certain regions a color-shifting layer, wherein the color-shifting effect of the color-shifting layer is such that the color-shift effects of the security element and the color-shift effects of the security feature based on magnetically aligned pigments correspond to each other.

18. The value document according to claim 15, wherein the security element and the security feature based on magnetically aligned pigments respectively have a further optical effect, and wherein the further optical effects produced correspond to each other.

19. An embossing tool comprising an embossing area capable of embossing the form of the facets of the security element recited in claim 1 into the carrier.

20. The security element according to claim 1, wherein the orientations of the facets of the different pixels provide a glitter effect.

21. A method of making a security element for security papers, the method comprising the steps:
providing a carrier having a surface that is so height-modulated in an areal region that the areal region is divided into a multiplicity of pixels with respectively at least one facet;
coating said facets so as to form reflective facets which reflect light incident along a predetermined direction on the areal region per pixel respectively directionally in a reflection direction predefined by their orientation;
making the area of each pixel smaller than the area of the areal region by at least one order of magnitude; and
arranging the orientations of the facets of different pixels to have random variation over the reflective areal region,
wherein in arranging the orientations of the facets, the orientations of the facets of different pixels are arranged to have a random variation around different average orientations predefined in a region-based manner, resulting in regionally different average reflection directions of the pixels.

22. The method according to claim 21, wherein the orientations of the facets of the different pixels are arranged to provide a glitter effect.

* * * * *